July 7, 1953 W. W. LEVAN 2,644,595
CRANE ARM FOR TRUCKS
Filed Jan. 12, 1950 2 Sheets-Sheet 1
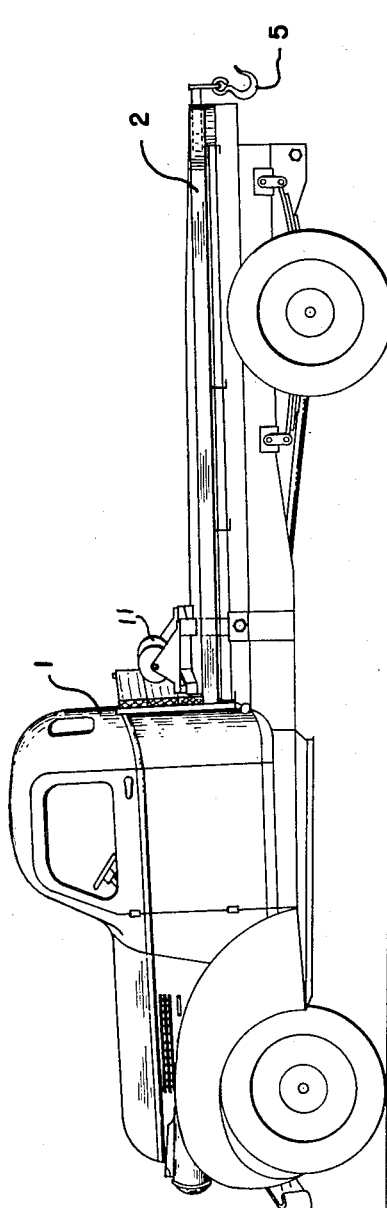
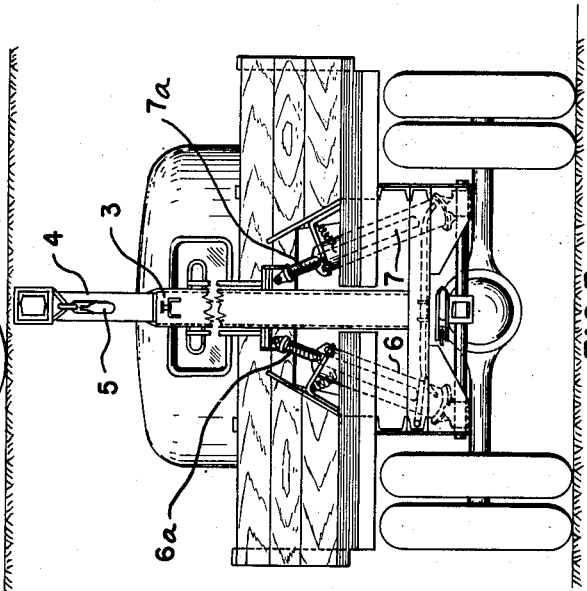
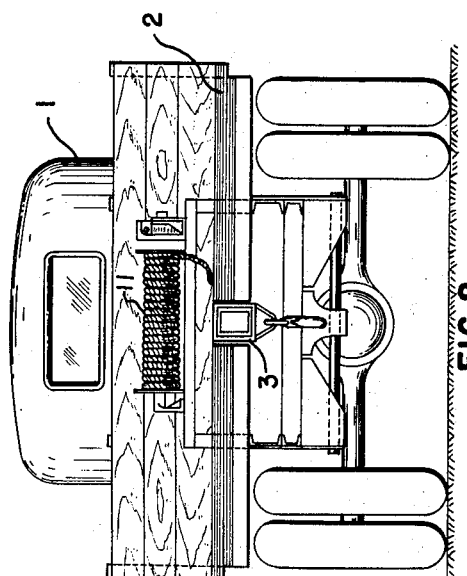
INVENTOR.
WALTER W. LEVAN
BY
Donald M. Stewart
ATTORNEY.

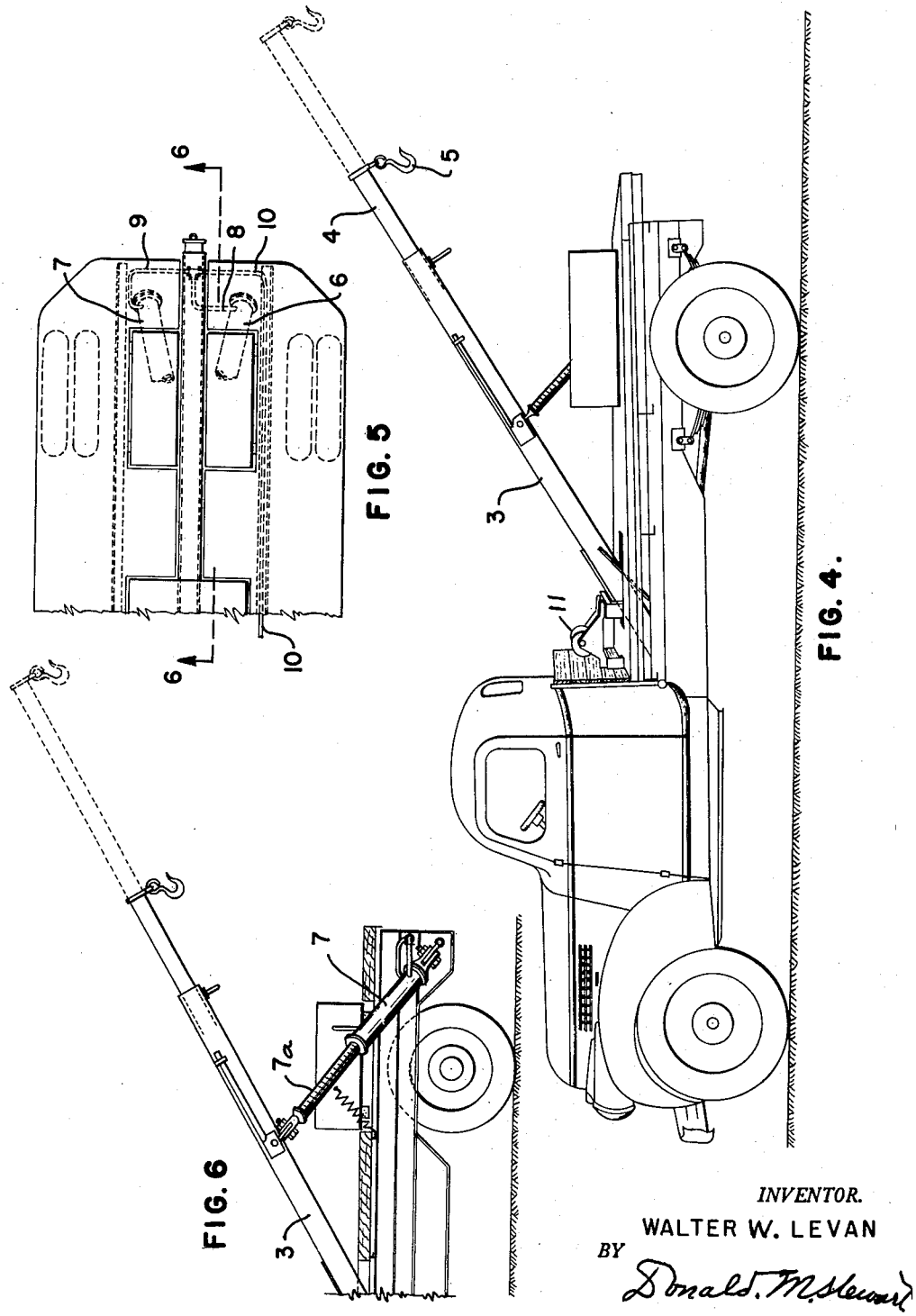

Patented July 7, 1953

2,644,595

UNITED STATES PATENT OFFICE 2,644,595

CRANE ARM FOR TRUCKS

Walter W. Levan, Fleetwood, Pa.

Application January 12, 1950, Serial No. 138,096

1 Claim. (Cl. 214—86)

This invention relates to a crane or tow hoist mounted on a truck in a manner so that the truck may be used either for general purpose hauling or for towing.

Common types of trucks embodying tow hoists, (so-called "wreckers"), have the outstanding disadvantage of not being readily usable also as trucks for hauling loads, etc. Also their hoist structures are generally complicated in design and must be operated manually exteriorly of the truck cab. Therefore, the structures are such as to limit the use of the truck, thus considerably increasing operating overhead.

An object of the present invention is to overcome the above named disadvantages of known types of tow hoists for trucks and to provide a combination tow hoist and general purpose truck which has apparatus which easily lends itself to conversion from one to the other form of truck.

A more specific object of this invention is to provide a novel hydraulically operated tow hoist mountable on a truck in such a manner that the boom may be either raised to any desired height to serve as a hoist or lowered into the truck floor to form part of the truck platform or flooring.

Other objects and advantages of the present invention will become apparent from a study of the following specification, taken with the accompanying drawings wherein:

Fig. 1 is a side elevational view of a truck having a tow hoist mounted thereon with its boom in a lowered position, which hoist embodies the principles of the present invention;

Fig. 2 is a rear view of the truck shown in Fig. 1;

Fig. 3 is a rear view of the truck shown in Fig. 1, except that the boom is in the raised instead of lowered position;

Fig. 4 is a side elevational view of the truck with the boom shown in the raised position;

Fig. 5 is a partial top plan view of the truck platform showing the boom nested within and forming part of the truck floor and showing the hydraulic system, and Fig. 6 is a cross-sectional view taken along line 6—6 of Fig. 5.

Referring more particularly to Figs. 1, 2 and 3, numeral 1 denotes a truck body of any desirable type having mounted thereon a loading platform or floor 2. Centrally of the platform 2 and extending longitudinally is a beam or boom 3 having a hollow rectangular cross-section and pivotally mounted near the forward end of the platform as shown more clearly in Fig. 4. Telescopically fitted within boom 3 is a boom extension 4 having secured to the end thereof a hook 5. The extension 4 may be pulled outwardly to any desired extent while boom 3 is in a horizotal position and may be locked in the extended position by any suitable mechanical means, (not shown), such as a screw threaded clamp, etc.

In order to raise and lower boom 3, there is provided a pair of hydraulic cylinders 6 and 7 whose lower ends are pivotally mounted on the chassis beneath the flooring. The cylinders may be raised to an angle of the order of 45° with respect to the vertical as shown more clearly in Fig. 6. Movable piston portions 6a and 7a extending from the tops of the hydraulic cylinders have their upper ends pivotally connected to flanges secured to the beam or boom 3. As will appear more clearly in Fig. 5, the hydraulic cylinders 6 and 7 are fed by pipe lines 8 and 9, which in turn are supplied by a main pipe line 10 extending longitudinally of the vehicle underneath the platform or floor to the front portion of the truck where the hydraulic cylinder or other source of hydraulic pressure, (not shown), is located and may be operated within the cab.

In operation, when the truck is to be used for general hauling purposes, boom 3 will be in the position shown in Figs. 1 and 2. In this position, the boom forms a portion of the truck platform or floor being nested therein as shown in Fig. 2 and hardly distinguishable from the remainder of the platform. The extension 4 is slid inwardly of the boom 3 and the truck otherwise has the appearance of any ordinary truck used for general hauling. The hook 5 which depends from the rear end thereof may be used for towing, if desired.

However, when it is desired to use the truck as a tow truck for towing a vehicle whose forward end must be raised, or for the purpose of lifting loads, the operator by suitable controls in the cab, (not shown), will introduce hydraulic fluid under pressure through pipes 8, 9 and 10 so as to raise the pistons 6a and 7a of the hydraulic cylinder 6 and 7 to any desired height, such as that shown in Figs. 4 and 6. Before or after the boom 3 is elevated, extension 4 may be slid outwardly to the position shown in dotted lines and locked in place by any suitable mechanical clamping means. In fact, if so desired, hydraulic means may also be used for extending or retracting extension 4 with respect to the beam 3. Thus beam 3 and extension 4 may be used as a boom for the hoist and hook 5 thereof may be used either for lifting or for towing loads. Of course, when it is desired to reconvert the truck for general hauling, all that is necessary is to remove the pressure in pipes 8, 9 and 10 which will allow the boom to move to the horizontal position. And by retracting the extension 4 therewithin the truck is in readiness for use for general hauling. A winch 11 may be used in conjunction with a sheave or pulley and block, (not shown), of well known construction and suspended on hook 5 if so desired.

Thus it will be seen that I have provided an efficient and relatively simple hoist construction which is embodied in the platform of a truck and is powered by hydraulic means in a way so that it may either be raised to convert the truck into a tow and hoisting truck (or wrecker) or which may be selectively lowered so as to form a part of the truck loading platform, thereby giving the truck a dual function.

While I have illustrated and described a certain specific embodiment of this invention, it will be understood that this is by way of illustration only, and that various changes and modifications may be made within the contemplation of my invention and within the scope of the following claim.

I claim:

In combination with a truck having a floor, a recess extending longitudinally and substantially centrally of said floor, a boom having one end pivotally mounted forwardly and well beneath the truck floor, said boom being of rectangular construction and having a telescopically fitting extension also of rectangular construction and a hook suspended at the end of said extension, hydraulic means for elevating said boom to selective angles about its pivot and upwardly from said recess, said hydraulic means comprising a pair of hydraulic cylinders whose lower ends are pivotally mounted on the chassis of said truck at a substantial distance underneath said floor, and whose upper portions extend through floor openings adjacent said recess through which said cylinders are adapted to project as the result of pivotal movement of said boom, a pair of pivotally mounted floor panels for covering said openings at the level of the floor and being connected to the upper portions of the cylinders so as to pivotally move to the open position as the cylinders are projected through the floor by pivotal raising movement of the boom, a movable piston extending from the upper end of each cylinder and pivotally connected to an intermediate portion of said boom, said hydraulic means including a source of hydraulic pressure for introducing fluid under pressure in said cylinders so as to raise the boom away from said recess and whereby upon removal of hydraulic pressure, said boom will be lowered into said recess in a manner so that the top surface of said boom will cover said recess at the level of said floor so as to provide a continuous flat, floor surface.

WALTER W. LEVAN.

References Cited in the file of this patent

UNITED STATES PATENTS

| Number | Name | Date |
|---|---|---|
| 2,283,443 | Klein | May 19, 1942 |
| 2,433,598 | Chadwick | Dec. 30, 1947 |
| 2,491,357 | Ashton | Dec. 13, 1949 |
| 2,502,108 | Taylor | Mar. 28, 1950 |
| 2,509,435 | Huttinger | May 30, 1950 |